United States Patent
Willardson et al.

(10) Patent No.: US 11,816,729 B1
(45) Date of Patent: Nov. 14, 2023

(54) APPARATUS FOR PRODUCING AN AUTONOMY SCORE AND A METHOD FOR ITS USE

(71) Applicant: Gravystack, Inc., Phoenix, AZ (US)

(72) Inventors: Chad Willardson, Phoenix, AZ (US); Scott Donnell, Phoenix, AZ (US); Travis Adams, Phoenix, AZ (US)

(73) Assignee: Gravystack, Inc., Phoenix, AZ (US)

( * ) Notice: Subject to any disclaimer, the term of this patent is extended or adjusted under 35 U.S.C. 154(b) by 0 days.

(21) Appl. No.: 17/872,624

(22) Filed: Jul. 25, 2022

(51) Int. Cl.
*G06Q 40/00* (2023.01)
*G06Q 40/03* (2023.01)

(52) U.S. Cl.
CPC .................. *G06Q 40/03* (2023.01)

(58) Field of Classification Search
CPC ...... G06Q 40/02; G06Q 40/025; G06Q 40/00; G06Q 40/03
USPC .................................. 705/4, 35–45
See application file for complete search history.

(56) References Cited

U.S. PATENT DOCUMENTS

| 8,170,943 | B2 | 5/2012 | Rojeck | |
|---|---|---|---|---|
| 8,676,689 | B1 | 3/2014 | Whelan | |
| 2007/0011071 | A1 | 1/2007 | Cuscovitch | |
| 2021/0073909 | A1* | 3/2021 | Le Roux | G06Q 40/03 |
| 2021/0142399 | A1* | 5/2021 | Joliveau | G06Q 40/02 |
| 2022/0198418 | A1* | 6/2022 | Kang | G06Q 20/02 |
| 2022/0215467 | A1* | 7/2022 | Virk | G06Q 40/03 |
| 2022/0277383 | A1* | 9/2022 | Sihavong | G06Q 40/12 |
| 2022/0343768 | A1* | 10/2022 | Di Cosola | G06Q 20/20 |

* cited by examiner

*Primary Examiner* — Jessica Lemieux
*Assistant Examiner* — Mohammed H Mustafa
(74) *Attorney, Agent, or Firm* — CALDWELL INTELLECTUAL PROPERTY LAW

(57) ABSTRACT

An apparatus for producing an autonomy score is disclosed. The apparatus includes at least a processor and a memory communicatively connected to the at least a processor. The memory instructs the processor to receive a pecuniary datum. The memory additionally instructs the processor to generate a pecuniary plan as a function of the pecuniary datum. The memory then instructs the processor to evaluate a pecuniary proficiency of a user as a function of the pecuniary plan. A pecuniary machine learning model is configured to be trained using a pecuniary training data. The pecuniary proficiency of a user is then evaluated as a function of the pecuniary plan. The memory then instructs the processor to produce an autonomy score as a function of the pecuniary proficiency. The memory finally instructs the processor to determine a pecuniary status of a user as a function of the pecuniary proficiency and the autonomy score.

16 Claims, 9 Drawing Sheets

APPARATUS FOR PRODUCING AN AUTONOMY SCORE AND A METHOD FOR ITS USE

FIELD OF THE INVENTION

The present invention generally relates to the field of data evaluation. In particular, the present invention is directed to an apparatus for producing an autonomy score.

BACKGROUND

Calculating the autonomy score of a user has long presented problems for experts worldwide. Identifying a user's autonomy score may provide a user with a clear picture of the management of a user's monetary resources.

SUMMARY OF THE DISCLOSURE

In an aspect, an apparatus for producing an autonomy score includes at least a processor and a memory communicatively connected to the at least a processor. The memory instructs the processor to receive a pecuniary datum. The memory additionally instructs the processor to generate a pecuniary plan as a function of the pecuniary datum. The memory then instructs the processor to evaluate a pecuniary proficiency of a user as a function of the pecuniary plan, wherein the pecuniary proficiency of the user is evaluated using a pecuniary machine learning model. The pecuniary machine learning model is configured to be trained using a pecuniary training data, wherein the pecuniary training data contains a plurality of data entries containing a plurality of pecuniary plans inputs correlated to a plurality of pecuniary proficiencies as outputs. The pecuniary machine learning model is configured to evaluate the pecuniary proficiency of a user as a function of the pecuniary plan. The memory then instructs the processor to produce an autonomy score as a function of the pecuniary proficiency. The memory finally instructs the processor to determine a pecuniary status of a user as a function of the pecuniary proficiency and the autonomy score.

In another aspect, method of producing an autonomy score is disclosed. The method includes receiving, using a processor, a pecuniary datum. The method may comprise generating, using the processor, a pecuniary plan as a function of the pecuniary datum. The method additionally comprise training a pecuniary machine learning model using a pecuniary training data, wherein the pecuniary training data contains a plurality of data entries containing a plurality of pecuniary plans inputs correlated to a plurality of pecuniary proficiencies as outputs. The method also comprises evaluating, using a processor, a pecuniary proficiency of a user as a function of the pecuniary plan, wherein the pecuniary proficiency of the user is evaluated using the pecuniary machine learning model. The method additionally comprises producing, using a processor, an autonomy score as a function of the pecuniary proficiency. Finally, the method determines, using a processor, a pecuniary status of a user as a function of the pecuniary proficiency and the autonomy score These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

At a high level, aspects of the present disclosure are directed to an apparatus for producing an autonomy score. The apparatus may include at least a processor and a memory communicatively connected to the at least a processor. The memory may instruct the processor to receive a pecuniary datum. The memory additionally may instruct the processor to generate a pecuniary plan as a function of the pecuniary datum. The memory then may instruct the processor to evaluate a pecuniary proficiency of a user as a function of the pecuniary plan, wherein the pecuniary proficiency of the user is evaluated using a pecuniary machine learning model. The pecuniary machine learning model is configured to be trained using a pecuniary training data, wherein the pecuniary training data contains a plurality of data entries containing a plurality of pecuniary plans inputs correlated to a plurality of pecuniary proficiencies as outputs. The pecuniary machine learning model is configured to evaluate the pecuniary proficiency of a user as a function of the pecuniary plan. The memory then may instruct the processor to produce an autonomy score as a function of the pecuniary proficiency. The memory may finally instruct the processor to determine a pecuniary status of a user as a function of the pecuniary proficiency and the autonomy score. Exemplary embodiments illustrating aspects of the present disclosure are described below in the context of several specific examples.

Figure 1:
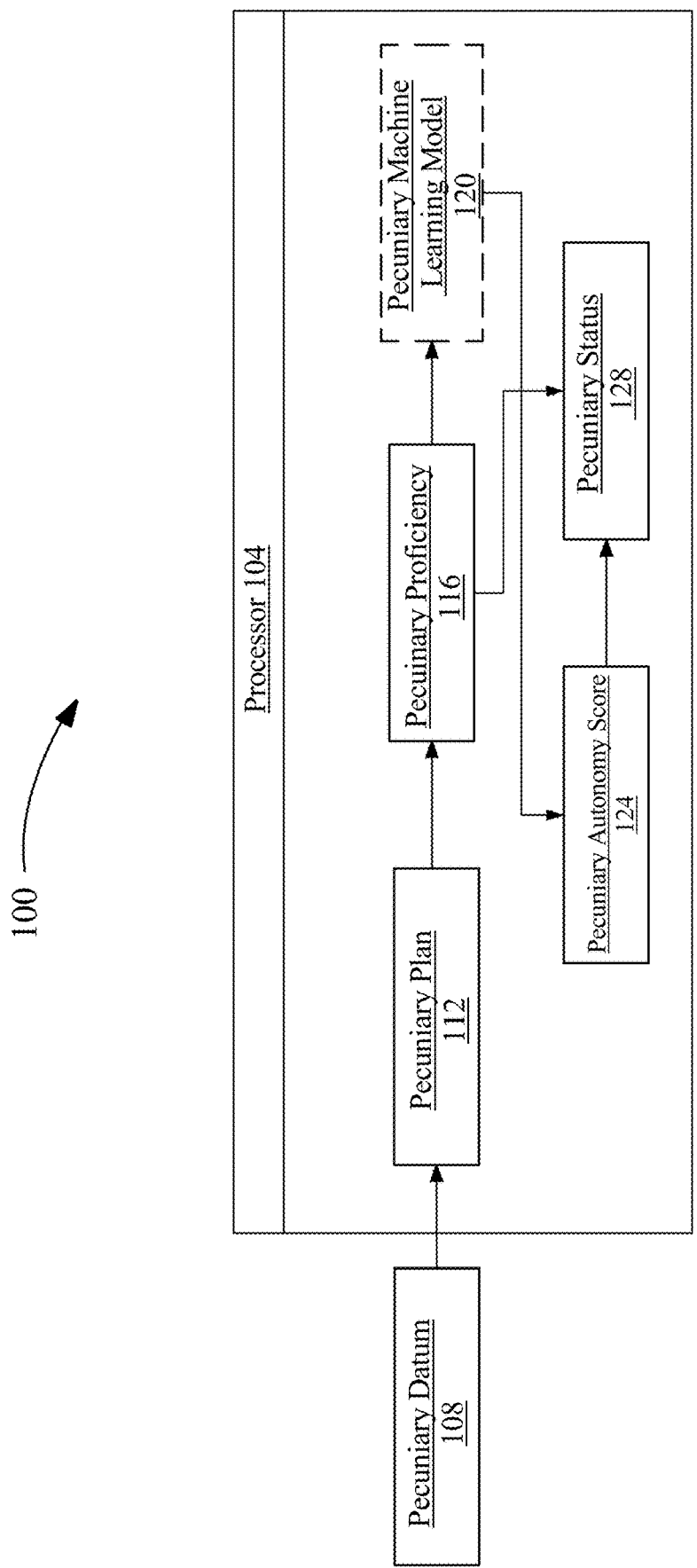
FIG. 1 is a block diagram of an exemplary embodiment of an apparatus for producing an autonomy score.

Referring now to FIG. 1, an exemplary embodiment of an apparatus 100 for producing an autonomy score is illustrated. Apparatus 100 includes a processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, processor 104 may be receive a pecuniary datum 108. As used in the current disclosure, a "pecuniary datum" is an element of data that is related to a user's assets, income, and debts. A pecuniary datum 108 may include bank records, credit card statements, investment portfolios, management agreements, real estate portfolio, mortgage agreements, debt statements, income statements, payroll records, and the like of a user. Pecuniary datum 108 may include user knowledge of real estate, stocks, business, investments, and the like. A "user," as used in this disclosure, is an entity that interacts with processor.

With continued reference to FIG. 1, apparatus 100 may generate pecuniary datum from inquiry data. As used in the current disclosure, "inquiry data" is an element of data that is generated from a series of answers to questions by the user. In an embodiment, questions may include multiple choice, short answer, fill in the blank, visual surveys, and the like. The inquiry data may include responses to a user survey given to a user. The survey may be presented to the user on a graphical user interface (GUI), as mentioned herein below. A GUI may display a plurality of questions for the user. Additionally, the user may input answers to those question into the GUI. The survey may include questions regarding the user's pecuniary datum 108, pecuniary status 128, pecuniary proficiencies 116, pecuniary plans 112, monetary resource, pecuniary target, pecuniary skill, autonomy score 124, and the like. Processor 104 may generate the questions using a decision tree. The inquiry data may be used at various points by apparatus 100. For example, the inquiry data may be a component of pecuniary datum 108. In some embodiments, inquiry data may be used to generate pecuniary datum 108.

With continuing reference to FIG. 1, processor 104 may be configured to generate questions for an inquiry data using a decision tree. A "decision tree," as used in this disclosure, is a data structure that represents and combines one or more determinations or other computations based on and/or concerning data provided thereto, as well as earlier such determinations or calculations, as nodes of a tree data structure where inputs of some nodes are connected to outputs of others. Decision tree may have at least a root node, or node that receives data input to the decision tree, corresponding to at least an entry indication. Decision tree may also have at least a terminal node, which may alternatively or additionally be referred to herein as a "leaf node," corresponding to at least an exit indication; in other words, decision and/or determinations produced by decision tree may be output at the at least a terminal node. Decision tree may include one or more internal nodes, defined as nodes connecting outputs of root nodes to inputs of terminal nodes. In an embodiment, an internal node of a decision tree may comprise the output of a machine learning model. Machine learning model may include any machine learning model mentioned herein below. (i.e. pecuniary plan classifier, inquiry classifier, and/or pecuniary machine learning model) Processor 104 may generate two or more decision trees, which may overlap; for instance, a root node of one tree may connect to and/or receive output from one or more terminal nodes of another tree, intermediate nodes of one tree may be shared with another tree, or the like.

Still referring to FIG. 1, processor 104 may build decision tree by following relational identification; for example, relational indication may specify that a first rule module receives an input from at least a second rule module and generates an output to at least a third rule module, and so forth, which may indicate to processor an in which such rule will be placed in decision tree. Building decision tree may include recursively performing mapping of execution results output by one tree and/or subtree to root nodes of another tree and/or subtree, for instance by using such execution results as execution parameters of a subtree. In this manner, processor 104 may generate connections and/or combinations of one or more trees to one another to define overlaps and/or combinations into larger trees and/or combinations thereof. Such connections and/or combinations may be displayed using a GUI to user, for instance in first view, to enable viewing, editing, selection, and/or deletion by user; connections and/or combinations generated thereby may be highlighted, for instance using a different color, a label, and/or other form of emphasis aiding in identification by a user. In some embodiments, subtrees, previously constructed trees, and/or entire data structures may be represented and/or converted to rule modules, with graphical models representing them, and which may then be used in further iterations or steps of generation of decision tree and/or data structure. As a further example, such subtrees, previously constructed trees, and/or entire data structures may become remote resources to which further iterations or steps of data structures and/or decision trees may transmit data and from which further iterations or steps of generation of data structure receive data, for instance as part of a decision in a given decision tree node.

With continued reference to FIG. 1. Processor 104 may generate a pecuniary datum 108 as a function of the inquiry data. Processor 104 may generate a pecuniary datum 108 by classifying the inquiry datum in to various categories. Categories may be used to indicate the financial health and status of the user. Processor 104 may generate categorize inquiry datum using an inquiry classifier. As used in the current disclosure, a "inquiry classifier" is a machine-learning model that sorts inputs into categories or bins of data, outputting the categories or bins of data and/or labels associated therewith. Inquiry classifier may be consistent with the classifier described below in FIG. 2. Inputs to the to the inquiry classifier may include a plurality of inquiry datum, previous examples of pecuniary datum 108, pecuniary proficiencies 116, examples of pecuniary plans 112, monetary resource, pecuniary target, pecuniary skill, autonomy score 124, and the like. The output of the inquiry classifier may comprise a pecuniary datum 108 that is specific to the given user. Inquiry training data is a plurality of data entries containing a plurality of inputs that are correlated to a plurality of outputs for training a processor by a machine-learning process to align and classify a user's inquiry datum to a pecuniary datum 108. Inquiry training data may be received from a database such as pecuniary database 300 of FIG. 3. Inquiry training data contains a plurality of data entries containing a plurality inquiry datum as an input correlated to a plurality of pecuniary datum 108 as an output. Inquiry training data may also correlate an example of pecuniary datum and an example of inquiry datum as an input correlated to a plurality of pecuniary datum 108 as an output. Inquiry training data may additionally correlate examples of pecuniary proficiencies 116 and pecuniary plans 112 as inputs to a pecuniary datum 108 as an output. Inquiry training data may contain information about plurality of plurality of inquiry datum, previous examples of pecuniary datum 108, pecuniary proficiencies 116, examples of pecuniary plans 112, monetary resource, pecuniary target, pecuniary skill, autonomy score 124, and the like. Inquiry training data may be generated from any past user pecuniary datum 108, inquiry data, and the like. In a non-limiting example, Inquiry training data may correlate an example of inquiry data to an example of a pecuniary datum 108. The "example of a pecuniary datum" and the "example of inquiry data" may be prior a prior pecuniary datum 108 and inquiry data, respectively. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. Inquiry classifier may include algorithms based on decision trees, such as decision tree classification or regression algorithms. Inquiry classifier may include ensemble methods such as bagging meta-estimator, forest of randomized tress, AdaBoost, gradient tree boosting, and/or voting classifier methods. Inquiry classifier s may include neural net algorithms, including convolutional neural net processes.

With continued reference to FIG. 1, a "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Processor 104 and/or another device may generate a classifier using a classification algorithm, defined as a processes whereby a computing device 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, processor may be configured to generate a machine learning model, such as inquiry classifier or pecuniary machine learning model 120, using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

Still referring to FIG. 1, processor may be configured to generate a machine learning model, such as inquiry classifier or pecuniary machine learning model 120, using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number experience of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With continued reference to FIG. 1. Processor 104 may generate a pecuniary plan 112 as a function of the pecuniary datum 108. As used in the current disclosure, a "pecuniary plan" is a series of instructions for achieving a pecuniary target. As used in the current disclosure, a "pecuniary target" is a goal of the growing or managing the monetary resources of the user. As used in the current disclosure, a "monetary resource" is an asset or debt of the user. In a non-limiting example, monetary resources may include income, debt, assets, real estate, businesses, trusts, stocks, bonds, and the like. In a non-limiting example, a pecuniary target may include building up personal saving by saving a predetermined amount of money over a given time period. A non-limiting example of a pecuniary target may include the purchase of a house, growing an investment portfolio, creating an emergency fund, balancing a budget, saving for retirement, saving for college, starting a new business, expanding a current business, debt reduction, increasing income, and the like. In another non-limiting example, the processor may generate a pecuniary target for the user to save a predetermined amount of money. A user may be assigned a plurality of a pecuniary targets as a function of a user input or an inquiry datum. In a non-limiting example, processor 104 may create a pecuniary plan 112 of purchasing a home. A non-limiting example of a pecuniary plan 112 for buying a home may be: 1. conducting an evaluation of the user's credit; 2. identifying a price range; 3. promoting the users to save enough money for a down payment; 4. identify a home for sale within the price range; 5. get a mortgage on the home; 6. close on the home. Additionally, a pecuniary plan 112 may be comprised of a plurality of steps and sub steps. A step may comprise a task that a user must complete in to achieve a pecuniary target. Once a user has achieved a plurality of steps and subs steps the user may achieve a waypoint. Processor 104 may ask a user for feedback on pecuniary plan 112 or pecuniary target. This may be done using a GUI. A user may be asked to rank their pecuniary targets in order of importance to them. In embodiments, a pecuniary plan 112 may be comprised of a set of waypoints. As used in the current disclosure, a "waypoint" is a milestone for accomplishing the user a pecuniary plan 112. A non-limiting example of a waypoint may be saving 20% of the total cost of a home for a down payment, in reference to the above example. As used in the current disclosure, a "milestone" is an event marking a significant change or progress for the user achieving his or her user pecuniary target.

With continued reference to FIG. 1, processor 104 may be configured to generate a pecuniary plan 112 as a function a classification of a pecuniary datum 108 to one or more pecuniary targets. As used in the current disclosure, a "pecuniary plan classifier" is a machine-learning model that sorts inputs into categories or bins of data, outputting the categories or bins of data and/or labels associated therewith.

Pecuniary plan classifier may be consistent with the classifier described below in FIG. 2. Inputs to the to the pecuniary plan classifier may include a pecuniary status 128, pecuniary datum 108, pecuniary proficiencies 116, examples of pecuniary plans 112, monetary resource, pecuniary target, pecuniary skill, autonomy score 124, and the like. The output to the classifier 128 may be a pecuniary plan 112 that is specific to the given user. Pecuniary plan training data is a plurality of data entries containing a plurality of inputs that are correlated to a plurality of outputs for training a processor by a machine-learning process to align and classify a user's pecuniary datum 108 to a pecuniary target. Pecuniary plan training data may be received from a database. Pecuniary plan training data may contain information about plurality of pecuniary status 128, pecuniary datum 108, pecuniary proficiencies 116, examples of pecuniary plans 112, monetary resource, pecuniary target, pecuniary skill, autonomy score 124, and the like. Pecuniary plan training data may be generated from any past user pecuniary targets, pecuniary datum 108, pecuniary plans 112, and the like. Pecuniary plan training data may correlate an example of a pecuniary datum 108 to an example of a pecuniary targets. The "example of a pecuniary target" and the "example of pecuniary datum" may be prior a prior pecuniary datum 108 and a pecuniary target, respectively. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With continued reference to FIG. 1, a classifier, such as pecuniary plan classifier, may be implemented as a fuzzy inferencing system. As used in the current disclosure, a "fuzzy inference" is a method that interprets the values in the input vector (i.e., pecuniary datum 108 and a pecuniary target) and, based on a set of rules, assigns values to the output vector. A set of fuzzy rules may include a collection of linguistic variables that describe how the system should make a decision regarding classifying an input or controlling an output. An example of linguistic variables may include variables that represent a pecuniary target. Examples of this may include two variables, one representing an amount of money and a second variable representing an increment of time. A non-limiting example of this may be saving $10,000 over six months. Additionally, A pecuniary plan 112 may for example, represent a degree of match between a first fuzzy set and a second fuzzy set, and/or single values therein with each other or with either set, which is sufficient for purposes of the matching process. A pecuniary plan 112 may indicate a sufficient degree of overlap with a fuzzy set representing a pecuniary datum 108 and a second fuzzy set representing an pecuniary target.

With continued reference to FIG. 1, processor 104 may generate a pecuniary proficiency 116. As used in the current disclosure, a "pecuniary proficiency" is an evaluation the effectiveness of a user's pecuniary skills as a function of a pecuniary plan. A pecuniary plan 112 may require a certain level of pecuniary skill to be achieved successfully. As used in the current disclosure, a "pecuniary skill" is a skill that allows a user to make competent decisions with their monetary resources. In a non-limiting example, pecuniary skills may include long-term financial planning, short-term financial planning, budgeting, asset management, debt management, general accounting skills, vocational skills, and the like. A pecuniary proficiency 116 may comprise an identification of the most relevant pecuniary skill of the user as it relates to a pecuniary plan 112. A pecuniary proficiency 116 may be represented by the intersection of two or more fuzzy sets. A pecuniary proficiency may also be the output of a pecuniary machine learning model 120 or a classifier. In an embodiment, a pecuniary proficiency 116 may be demonstrated by linguistic categories. In a non-limiting example, a linguistic category may include "proficient," "satisfactory," "unsatisfactory," "exceptional," adequate," "inadequate," and the like. A pecuniary proficiency 116 may also comprise a score or a set of scores. A score or a set of scores to reflect a pecuniary proficiency 116 or pecuniary skill may be evaluated on a numerical scale. A non-limiting example of a numerical scale is a scale of 1-10, whereas a 1 would be a user who has poor pecuniary skills and a 10 would represent a user who has excellent pecuniary skills. In embodiments, the pecuniary skill of the user may be evaluated as a function of how likelihood that a user will be able to complete a pecuniary plan 112. In a non-limiting example, a pecuniary plan 112 may require a user to grow his/her investments by 25% over the course of 4 years. A pecuniary proficiency 116 may identify the pecuniary skills of short-term financial planning, budgeting, and asset management as the most relevant pecuniary skills for accomplishing a given task. Still referring to the above non-limiting example, a pecuniary proficiency 116 may additionally identify that the user has asset management skills at 6 out of 10. As a function of users asset management skills, a user may be given a pecuniary proficiency 116 of 8 out of 10, meaning that it highly likely the user will be successful in accomplishing his/her pecuniary plan 112.

With continued reference to FIG. 1, an evaluation of a user's pecuniary proficiency 116 may also include comparing how a user has implemented his/her pecuniary plan 112 over a given period of time. A user may be deemed to have a high pecuniary proficiency if the user has properly managed his/her monetary assets. An evaluation of a pecuniary skill may be evaluated as a function of a user's management of his/her assets. In an embodiment, this may be done continuously constantly updating a user's pecuniary proficiency 116. In another embodiment, this may be done over a pre-determined time increment. A user may be deemed to have a poor pecuniary proficiency their monetary assets have declined or failed as a function of the users decisions. User decision may be determined through when, where, and how a user invested his/her monetary resources. Mitigating circumstances may also be a part of the evaluation such as acts of God, the status of the economic market, emergency circumstances, and the like. In a non-limiting example, a user decision may comprise the purchase 500 shares of stock on a given date and time. Another example, of a user decision may include purchases such as cars, homes, food, shopping, etc. User decision may be contained within the users bank records, credit card statements, investment portfolios, management agreements, real estate portfolio, mortgage agreements, debt statements, income statements, payroll records, and the like of a user. Evaluations of user decisions may be evaluated as a function of how they help a user progress his/her pecuniary plan 112.

With continued reference to FIG. 1, evaluation of pecuniary proficiency 116 may occur by comparing how the user managed his/her monetary resources to other people who are similarly situated. A user decision that has been profitable may be reflected positively in a user's pecuniary proficiency 116. With continued reference to the above example, if the user's 500 shares of stock has increased in value by 50% while similarly situated users investments only increased by 15% this may increase the user's pecuniary proficiency 116. However, if the user's shares of stock decrease significantly in value while similarly situated users investments only increased by 15% this may be reflected by decreasing the users pecuniary proficiency 116. Pecuniary proficiency 116 may include an evaluation of the users spending habits and/or debt compared to their income. Pecuniary proficiency 116 may include an evaluation of the users financial planning skills to grow their assets or income. This may be done by the evaluating the users depth of knowledge regarding his/her chosen financial plan. A pecuniary proficiency may be generated using a pecuniary machine learning model 120.

With continued reference to FIG. 1, processor 104 may be configured to evaluate pecuniary proficiency 116 using a using a pecuniary machine learning model 120. As used in the current disclosure, a "pecuniary machine learning model" is a mathematical and/or algorithmic representation of a relationship between inputs and outputs. In some embodiments, a pecuniary machine learning model 120 may comprise a classifier. A pecuniary machine learning model 120 may be consistent with the machine learning model described herein below in FIG. 2. Inputs to the machine learning model may include an example of pecuniary proficiencies 116, an example of pecuniary plans 112, monetary resource, pecuniary target, pecuniary skill, and the like. This data may be received from a database, such as pecuniary database 300. Example pecuniary proficiencies 116 and pecuniary plans 112 may come from the current user or users similarly situated to the users by user interest, pecuniary proficiency 116, and/or monetary resources. Pecuniary machine learning model 120 may by trained using pecuniary training data. Pecuniary training data is a plurality of data entries containing a plurality of inputs that are correlated to a plurality of outputs for training a processor 104 by a machine-learning process. Pecuniary training data may include example of pecuniary proficiencies 116, an example of pecuniary plans 112, monetary resource, pecuniary target, pecuniary skill, and the like. Pecuniary training data may include past pecuniary proficiencies 116 and pecuniary plans 112. Pecuniary training data may be stored in a database, such as a training data database, or remote data storage device, or a user input or device.

With continued reference to FIG. 1, processor 104 may be configured to generate a pecuniary skill target as a function of pecuniary proficiency 116. As used in the current disclosure, a "pecuniary skill target" is level or improvement of a pecuniary skill a user would like to achieve. In embodiments, a skill target may an improvement of pecuniary skill. Examples of pecuniary skill target may include starting a new career, developing new vocational skill, improving budget management skills, advancing current vocational skills, furthering the user's education, buying, or selling an asset, debt reduction, asset growth, income growth, investment management, and the like. A pecuniary skill target may be generated using a target machine learning model or as a function of pecuniary plan 112.

With continued reference to FIG. 1, processor 104 may generate a pecuniary improvement datum as a function of pecuniary proficiency 116. As used in the current disclosure, "pecuniary improvement datum" is a set of instructions configured to improve pecuniary proficiency 116. A pecuniary improvement datum may encompass an evaluation of pecuniary proficiency 116. In an embodiment, pecuniary improvement datum may include a plurality of tasks that will augment pecuniary datum 108 in a favorable manner. This may also include one or more remedial tasks such as educating the user regarding the cause of the undesirable pecuniary datum 108 or pecuniary proficiency 116. Pecuniary improvement datum may be generated as a function of a pecuniary datum 108 or a pecuniary proficiency 116. In a non-limiting example, a pecuniary improvement datum may suggest drills or tasks that will help the user's pecuniary proficiency 116 improve from a 4 to a 7. A pecuniary improvement datum may additionally suggest areas where a user improve their pecuniary datum 108 or improve efficiency in application of their pecuniary skills. This may include time saving suggestions, material saving suggestions, technique suggestions, budget suggestions and the like. A non-limiting example of pecuniary improvement datum may include instructions about how to reduce a undesired actions.

Still referring to FIG. 1, an autonomy score 124 may be generated as a function of a pecuniary datum 108. As used in the current disclosure, an "autonomy score" is a ranking of how monetarily autonomous a user is. As used in the current disclosure, "monetary autonomy" is the status of the user having enough monetary resources to pay for a user's living expenses for the rest of the user's life without having to be employed or dependent on other people. An autonomy score 124 may be calculated using a numerical scale. A non-limiting example, of a numerical scale may include a scale from 1-10, wherein a rating of 1 may be a highly dependent on outside income whereas a rating of 10 may be a person who is fully monetarily autonomous. An autonomy score 124 may be generated from pecuniary datum 108 or pecuniary proficiency. An autonomy score 124 may be used to generate a pecuniary target. In a non-limiting example, a user may have an autonomy score 124 of a 5, and as a function of this autonomy score 124 a pecuniary target may be established to achieve an autonomy score 124 of 7.

With continued reference to FIG. 1, processor 104 may be configured to augment an autonomy score 124 as a function of user demographics. As used in the current disclosure, a "user demographics" is the statistical characteristics of the user. A non-limiting example, of user demographics of user the users age, education level, occupation, marital status, and the like. In an embodiment, it may require a significantly more monetary resources to a user to achieve a high autonomy score 124 at a younger age such as 22 years old. Conversely, it may require a significantly less monetary resources to a user to achieve a high autonomy score 124 at an older age such as 65 years old. In another embodiment, an autonomy score 124 may a user's spouse when generating an autonomy score 124. This may include requiring more monetary resources to achieve a higher autonomy score 124.

With continued reference to FIG. 1, processor 104 may be configured to augment an autonomy score 124 as a function of actual data. As used in the current disclosure, "actuarial data" is an element of data relating to the statistical calculation especially of life expectancy. In a non-limiting example, a user's who has actuarial data that suggests a life expectancy of 20 years may require a fewer monetary resources to achieve financial autonomy when compared to a user who has a life expectancy of 65 years.

With continued reference to FIG. 1, processor 104 may be configured to augment an autonomy score 124 as a function of user income predictions. As used in the current disclosure, a "user income predictions" is a prediction of the how much income a user will generate in the future. Processor 104 may consider the users occupation, health, and current career trajectory to generate a user income prediction. In a non-limiting example, an autonomy score 124 may be increased user if the user is predicted to generate a higher income from now the until user retires.

With continued reference to FIG. 1, processor 104 may be configured to autonomy score 124 using a using an Autonomy machine learning model. As used in the current disclosure, a "Autonomy machine learning model" is a mathematical and/or algorithmic representation of a relationship between inputs and outputs. An autonomy machine learning model may be consistent with the machine learning model described herein below in FIG. 2. Inputs to the machine learning model may include examples of autonomy score 124, user demographics, actuarial data, user income predictions, pecuniary datum 108, pecuniary proficiencies 116, pecuniary plans 112, monetary resource, pecuniary target, pecuniary skill, and the like. This data may be received from a database, such as pecuniary database 300. An example of autonomy score 124 may come from the current user or users similarly situated to the users by user autonomy score 124, pecuniary proficiency 116, and/or monetary resources. Autonomy machine learning model may by trained using autonomy training data. Autonomy training data is a plurality of data entries containing a plurality of inputs that are correlated to a plurality of outputs for training a processor 104 by a machine-learning process. Autonomy training data may include examples of Autonomy training data may include past autonomy score 124, pecuniary proficiencies 116, pecuniary datum 108, pecuniary status 128, and the like. Autonomy training data may be stored in a database, such as a training data database, or remote data storage device, or a user input or device.

With continued reference to FIG. 1, processor 104 may be designed and configured to create an autonomy machine learning model using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm mounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

With continued reference to FIG. 1, processor 104 may be configured to determine a pecuniary status 128 of a user as a function of the pecuniary proficiency 116 and the autonomy score 124. As used in the current disclosure, a "pecuniary status" is a prediction of when the user will reach monetary autonomy. A pecuniary status 128 may be based on the users current pecuniary proficiency 116 and the current autonomy score 124. This prediction may be done by comparing a user's pecuniary proficiency 116 and autonomy score 124 to other users who are similarly situated. A pecuniary status 128 may be described in terms of times and monetary resources investment. In a non-limiting example, a pecuniary status 128 may be reached once if a user invests 300$ dollars a month over the course of 25 years in an index fund. A pecuniary status 128 may provide the user with the type and style of investment in which a user needs to participate in. A pecuniary status 128 may also take in to account a pecuniary plan 112. A pecuniary status 128 may also be an overall evaluation of the user's management of their monetary resources.

With continued reference to FIG. 1, processor 104 may be configured to determine a pecuniary status 128 as a function of geographic datum. As used in the current disclosure, "geographic datum" is an element of datum used to identify a pecuniary status 128 based on a pre-determined geographic area. Geographic datum may be generated via user input or the use of a GPS tracker or a sensor. This may be done using a device such as a computer, smartphone, laptop, tablet, and the like. Geographic datum may group other users with similar pecuniary proficiency 116 and the autonomy score 124 as a function of their geographic proximity. In embodiments, Geographic proximity may include any radius from a given point. Geographic proximity may also include a city, county, state, zip code, area code, and the like. For example, a user may have a pecuniary status 128 that requires 500$ over 25 years as a function of a geographic datum indicating the user is living in New York City.

With continued reference to FIG. 1, Processor 104 may be configured to evaluate pecuniary status 128 using a using a Status machine learning model. As used in the current disclosure, a "Status machine learning model" is a mathematical and/or algorithmic representation of a relationship between inputs and outputs. A Status machine learning model may be consistent with the machine learning model described herein below in FIG. 2. Inputs to the machine learning model may include examples of pecuniary status 128, pecuniary datum 108, pecuniary proficiencies 116, pecuniary plans 112, monetary resource, pecuniary target, pecuniary skill, autonomy score 124, and the like. This data may be received from a database, such as pecuniary database 300. An example of pecuniary status 128 may come from the current user or users similarly situated to the users by user autonomy score 124, pecuniary proficiency 116, and/or monetary resources. Status machine learning model may by trained using status training data. Status training data is a plurality of data entries containing a plurality of inputs that are correlated to a plurality of outputs for training a processor 104 by a machine-learning process. Status training data may include examples of. Status training data may include past pecuniary proficiencies 116, pecuniary datum 108, pecuniary status 128, and autonomy score 124. Status training data may be stored in a database, such as a training data database, or remote data storage device, or a user input or device.

With continued reference to FIG. 1, processor 104 may be configured to generate a decentralized fiat as a function of progressing towards of a pecuniary status 128. As used in the current disclosure, a "decentralized fiat" is a bank-free method of transferring wealth or ownership of any other commodity without needing a third party. Decentralized fiat may include a non-fungible token or various crypto currencies. A "non-fungible token," as used in this disclosure, is a unique and non-interchangeable unit of data stored on a digital ledger and/or immutable sequential listing. "Cryptocurrency," as used in this disclosure, is a digital or virtual currency that is secured by cryptography. This makes it nearly impossible to counterfeit or double-spend. In some embodiments, cryptocurrencies are decentralized networks based on blockchain technology such as immutable sequential listing enforced by a network of computing devices. In some embodiments, apparatus 100 may allow various types of cryptocurrency such as Ethereum (ETH), Litecoin (LTC), Cardano (ADA), Polkadot (DOT), Bitcoin Cash (BCH), Stellar (XLM), and the like thereof. Persons skilled in the art, upon reviewing the entirety of this disclosure, will be aware of the various embodiments of different types of money for purposes as described herein. Decentralized fiat may be associated with reproducible digital files such as photos, videos, and audio. Decentralized fiat may also be associated with physical assets such as real estate, collectables, and other commodities. In an embodiment, processor 104 may issue a certificate of completion after a user has achieved pecuniary target, improved pecuniary proficiency 116 or autonomy score 124, or progressed towards a pecuniary status 128. Decentralized fiat may be used to represent a certificate of completion. Possession or payment of decentralized fiat may serve as proof that the user has accomplished all or a portion of a pecuniary target or improved a pecuniary proficiency and/or pecuniary autonomy. In embodiments, the time and level of difficulty for the user to improve pecuniary proficiency, autonomy score, pecuniary, may be demonstrated by the value of decentralized fiat. The creator may "tokenize" such assets to be stored on a digital ledger and/or immutable sequential listing, which may ensure non-duplicability and ownership, generate income, and/or enable accessibility of the assets. Persons skilled in the art, upon reviewing the entirety of this disclosure, will be aware of the various embodiments and purposes of tokenizing an asset.

With continued reference to FIG. 1, pecuniary status 128, pecuniary proficiencies 116, pecuniary plans 112, monetary resource, pecuniary target, pecuniary skill, autonomy score 124, and the like may be displayed using a graphical user interface (GUI). As used in the current disclosure, a "graphical user interface" may include a plurality of lines, images, symbols. GUI may be displayed on a display device. Display device may include, but is not limited to, a smartphone, tablet, laptop, monitor, tablet, and the like. Display device may include a separate device that includes a transparent screen configured to display computer generated images and/or information. The user may view the information displayed on the display device in real time.

With continued reference to FIG. 1, apparatus 100 may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

With continued reference to FIG. 1, in embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where $A+B=-R$, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

With continued reference to FIG. 1, in some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

With continued reference to FIG. 1, in an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatnn hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Continuing to refer to FIG. 1, a "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

With continued reference to FIG. 1, secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

With continued reference to FIG. 1, alternatively, zero-knowledge proof may include a non-interactive zero-knowledge, proof, or a proof wherein neither party to the proof interacts with the other party to the proof, for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

With continued reference to FIG. 1, a zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof Persons skilled in the art, upon reviewing the entirety of this disclosure, will be aware of various forms of zero-knowledge proofs that may be used, singly or in combination, consistently with this disclosure.

With continued reference to FIG. 1, in an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

With continued reference to FIG. 1, A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

Still viewing FIG. 1, in some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

With continued reference to FIG. 1, in some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Figure 2:
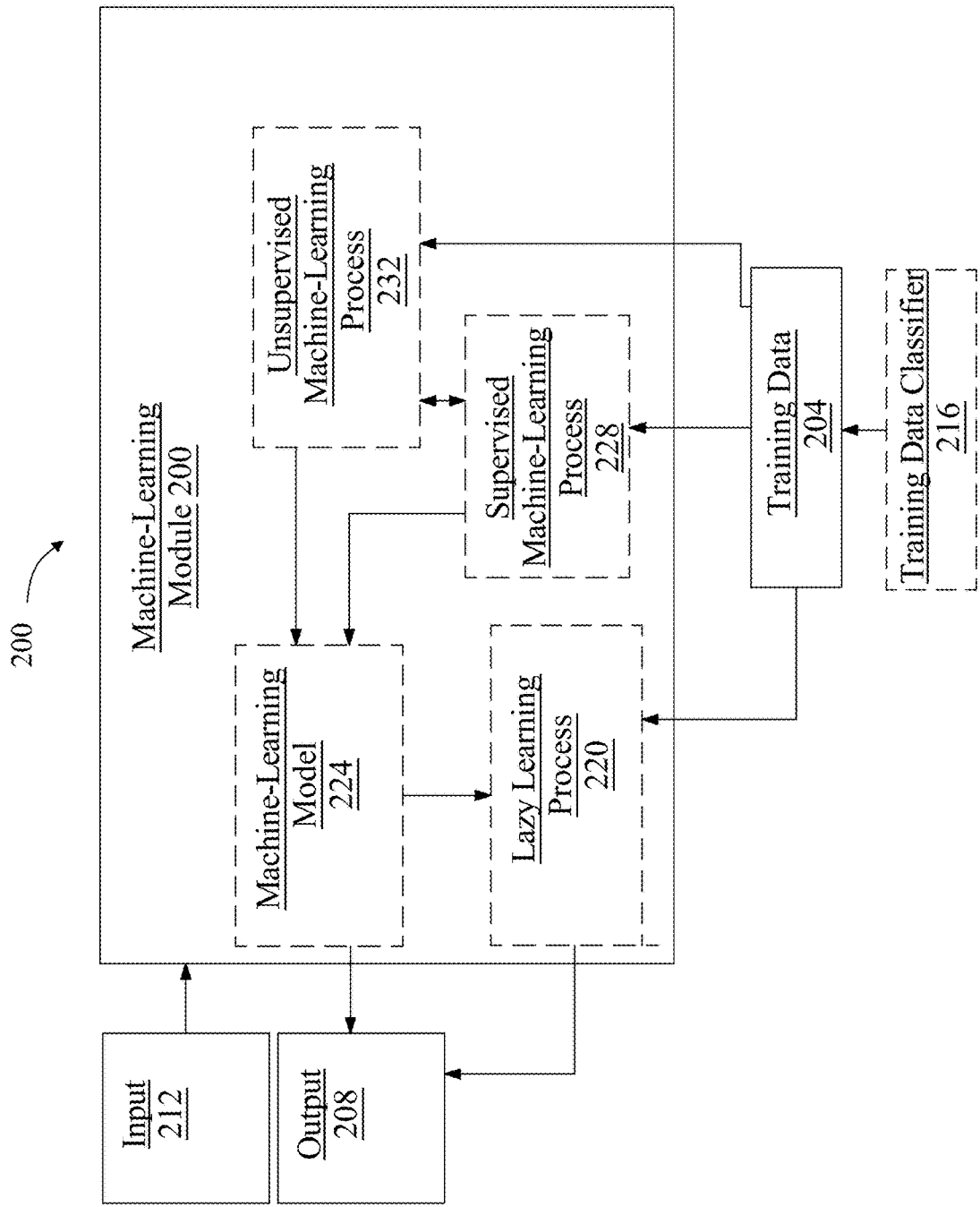
FIG. 2 is a block diagram of an exemplary machine-learning process.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include a pecuniary status 128, pecuniary proficiencies 116, pecuniary plans 112, autonomy score 124, and the like as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

For example, and still referring to FIG. 2, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, a node may include, without limitation a plurality of inputs x; that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function p, which may generate one or more outputs y. Weight $w_i$ applied to an input x; may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Figure 3:
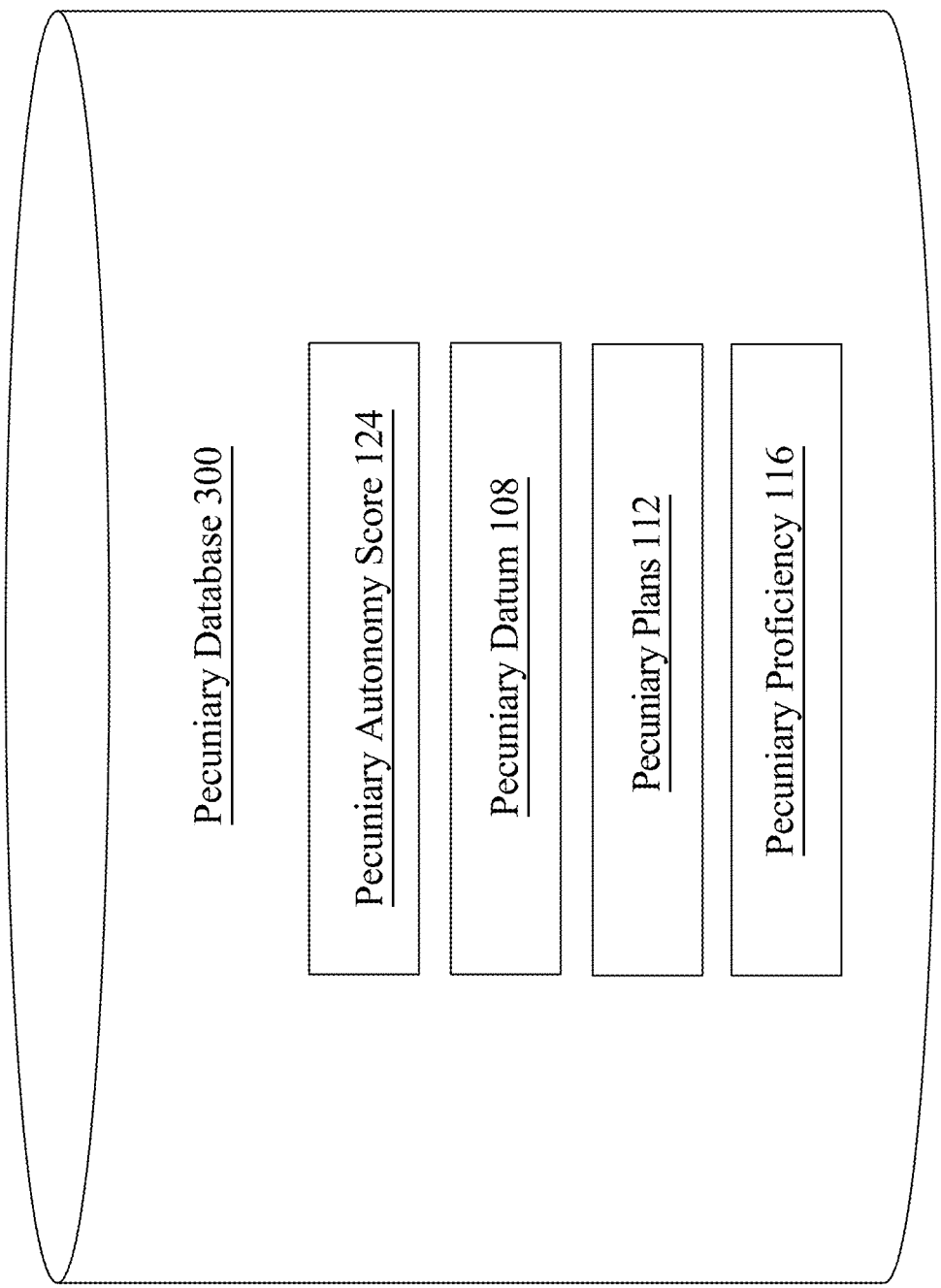
FIG. 3 is a block diagram of an exemplary embodiment of a pecuniary database.

Now referring to FIG. 3, an exemplary pecuniary database 300 is illustrated by way of block diagram. In an embodiment, pecuniary status 128, pecuniary datum 108, pecuniary proficiencies 116, pecuniary plans 112, monetary resource, pecuniary target, pecuniary skill, autonomy score 124 and the like may be stored in a pecuniary database 300 (also referred to as "database"). Processor 104 may be communicatively connected with posting database 300. For example, in some cases, database 300 may be local to processor 104. Alternatively or additionally, in some cases, database 300 may be remote to processor 104 and communicative with processor 104 by way of one or more networks. Network may include, but not limited to, a cloud network, a mesh network, or the like. By way of example, a "cloud-based" system, as that term is used herein, can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 104 connect directly, dynamically, and non-hierarchically to as many other computing devices as possible. A "network topology" as used in this disclosure is an arrangement of elements of a communication network. Pecuniary database 300 may be implemented, without limitation, as a relational database, a key-value retrieval database such as a NOSQL database, or any other format or structure for use as a database that a person skilled in the art would recognize as suitable upon review of the entirety of this disclosure. Pecuniary database 300 may alternatively or additionally be implemented using a distributed data storage protocol and/or data structure, such as a distributed hash table or the like. Pecuniary database 300 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Figure 4:
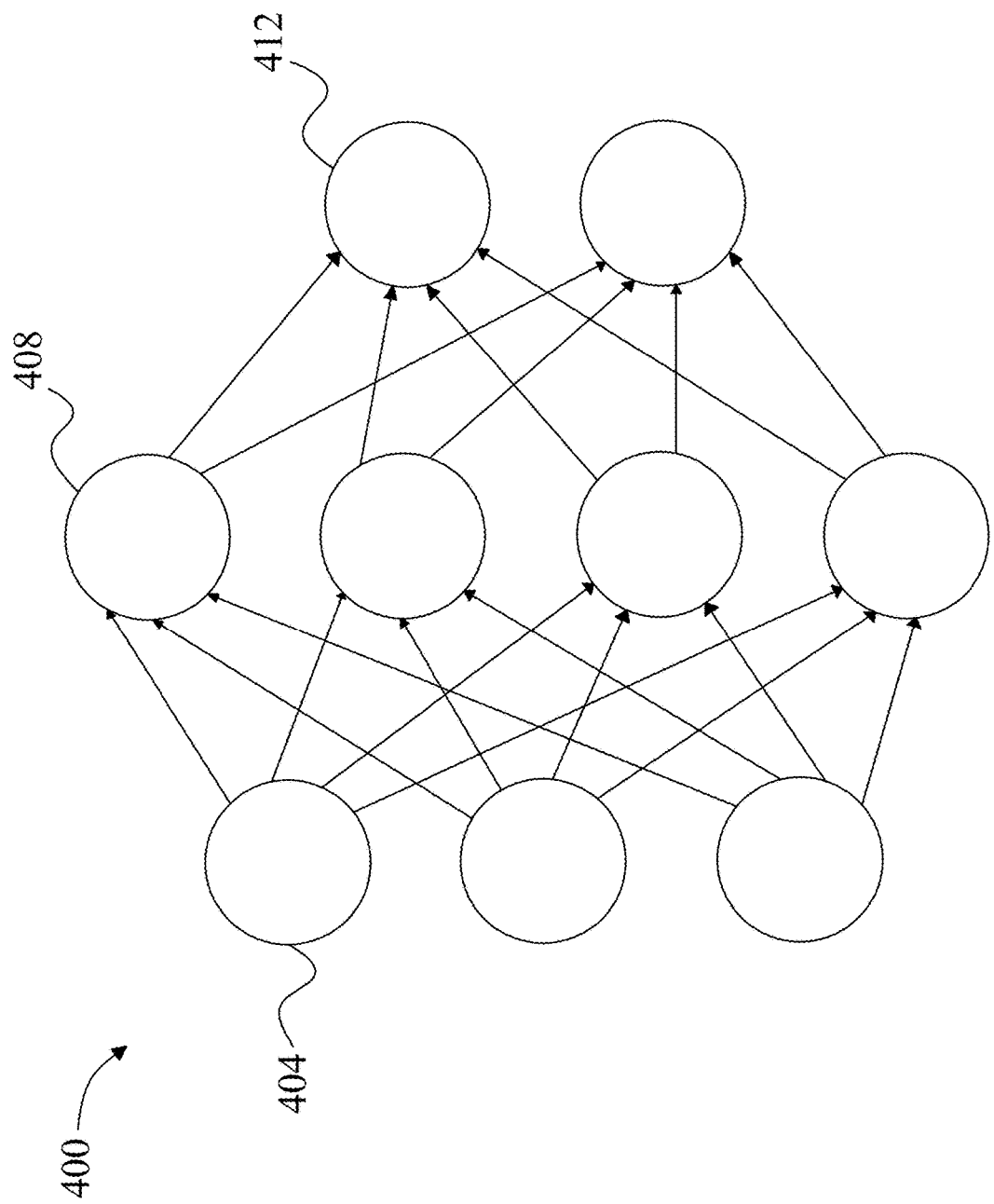
FIG. 4 is a diagram of an exemplary embodiment of neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
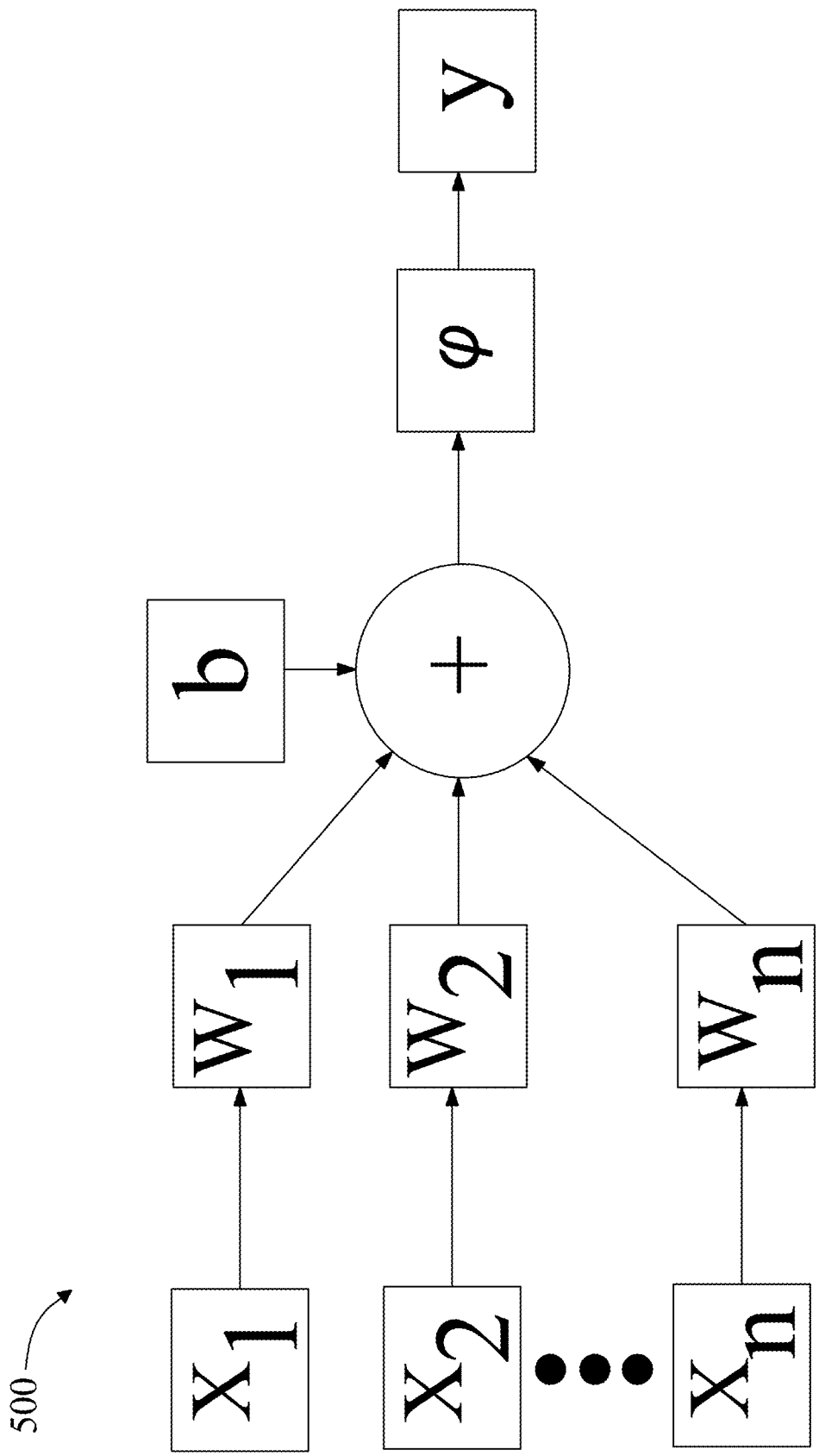
FIG. 5 is a diagram of an exemplary embodiment of a node of a neural network.

Referring now to FIG. 5, an exemplary embodiment of a node of a neural network is illustrated. A node may include, without limitation a plurality of inputs x; that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function ρ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights w may be determined by training a neural network using training data, which may be performed using any suitable process as described above.

Figure 6:
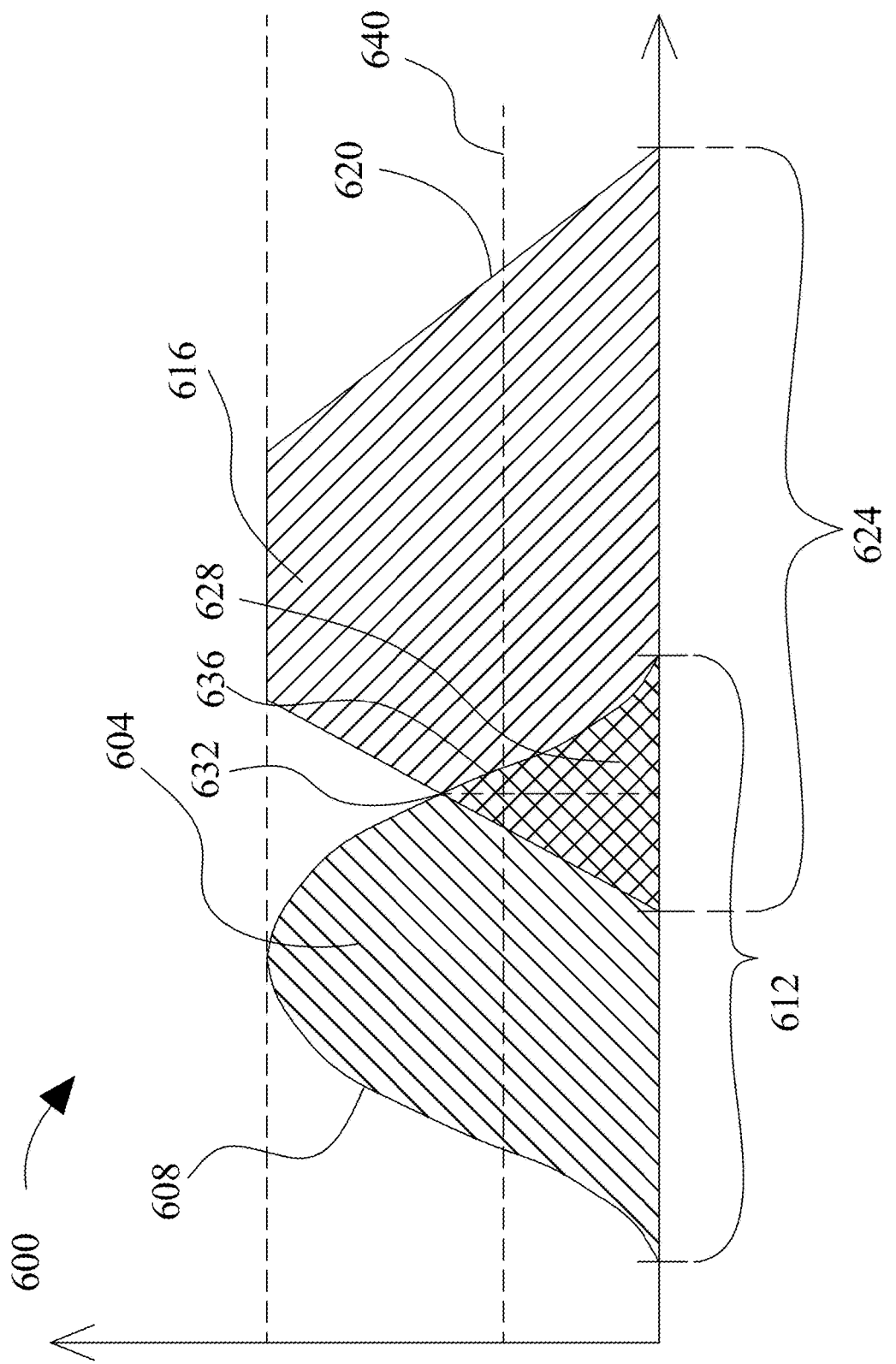
FIG. 6 is a graph illustrating an exemplary relationship between fuzzy sets.

Now referring to FIG. 6, an exemplary embodiment of fuzzy set comparison 600 is illustrated. In a non-limiting embodiment, the fuzzy set comparison. In a non-limiting embodiment, fuzzy set comparison 600 may be consistent with fuzzy set comparison in FIG. 1. In another non-limiting the fuzzy set comparison 600 may be consistent with the name/version matching as described herein. For example and without limitation, the parameters, weights, and/or coefficients of the membership functions may be tuned using any machine-learning methods for the name/version matching as described herein. In another non-limiting embodiment, the fuzzy set may represent user pecuniary status 128, pecuniary proficiencies 116, autonomy score 124, and the like from FIG. 1.

Alternatively or additionally, and still referring to FIG. 6, fuzzy set comparison 600 may be generated as a function of determining data compatibility threshold. The compatibility threshold may be determined by a computing device. In some embodiments, a computing device may use a logic comparison program, such as, but not limited to, a fuzzy logic model to determine the compatibility threshold and/or version authenticator. Each such compatibility threshold may be represented as a value for a posting variable representing the compatibility threshold, or in other words a fuzzy set as described above that corresponds to a degree of compatibility and/or allowability as calculated using any statistical, machine-learning, or other method that may occur to a person skilled in the art upon reviewing the entirety of this disclosure. In some embodiments, determining the compatibility threshold and/or version authenticator may include using a linear regression model. A linear regression model may include a machine learning model. A linear regression model may map statistics such as, but not limited to, frequency of the same range of version numbers, and the like, to the compatibility threshold and/or version authenticator. In some embodiments, determining the compatibility threshold of any posting may include using a classification model. A classification model may be configured to input collected data and cluster data to a centroid based on, but not limited to, frequency of appearance of the range of versioning numbers, linguistic indicators of compatibility and/or allowability, and the like. Centroids may include scores assigned to them such that the compatibility threshold may each be assigned a score. In some embodiments, a classification model may include a K-means clustering model. In some embodiments, a classification model may include a particle swarm optimization model. In some embodiments, determining a compatibility threshold may include using a fuzzy inference engine. A fuzzy inference engine may be configured to map one or more compatibility threshold using fuzzy logic. In some embodiments, a plurality of computing devices may be arranged by a logic comparison program into compatibility arrangements. A "compatibility arrangement" as used in this disclosure is any grouping of objects and/or data based on skill level and/or output score. Membership function coefficients and/or constants as described above may be tuned according to classification and/or clustering algorithms. For instance, and without limitation, a clustering algorithm may determine a Gaussian or other distribution of questions about a centroid corresponding to a given compatibility threshold and/or version authenticator, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Still referring to FIG. 6, inference engine may be implemented according to input and/or output pecuniary status 128, pecuniary proficiencies 116, and autonomy score 124. For instance, an acceptance variable may represent a first measurable value pertaining to the classification of a pecuniary proficiency 116 and an autonomy score 124 to a pecuniary status 128. Continuing the example, an output variable may represent a pecuniary status 128 specific the current user. In an embodiment, pecuniary proficiencies 116 and an autonomy score 124 may be represented by their own fuzzy set. In other embodiments, a pecuniary status 128 specific to the user may be represented as a function of the intersection two fuzzy sets as shown in FIG. 6, An inference engine may combine rules, such as any semantic versioning, semantic language, version ranges, and the like thereof. The degree to which a given input function membership matches a given rule may be determined by a triangular norm or "T-norm" of the rule or output function with the input function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \le x < b \\ \frac{c-x}{c-b}, \text{ if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

First fuzzy set 604 may represent any value or combination of values as described above, including any software component datum, any source repository datum, any malicious quantifier datum, any predictive threshold datum, any string distance datum, any resource datum, any niche datum, and/or any combination of the above. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 636 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, an achievable pecuniary status 128 may indicate a sufficient degree of overlap with the pecuniary proficiency 116 and an autonomy score 124 for combination to occur as described above. There may be multiple thresholds; for instance, a second threshold may indicate a sufficient match for purposes of past posting and posting query as described in this disclosure. Each threshold may be established by one or more user inputs. Alternatively or additionally, each threshold may be tuned by a machine-learning and/or statistical process, for instance and without limitation as described in further detail below.

In an embodiment, a degree of match between fuzzy sets may be used to rank one resource against another. For instance, if both have fuzzy sets, a proficiency 116 and an autonomy score 124 may be matched to a pecuniary status 128 by having a degree of overlap exceeding a predictive threshold, processor 104 may further rank the two resources by ranking a resource having a higher degree of match more highly than a resource having a lower degree of match. Where multiple fuzzy matches are performed, degrees of match for each respective fuzzy set may be computed and aggregated through, for instance, addition, averaging, or the like, to determine an overall degree of match, which may be used to rank resources; selection between two or more matching resources may be performed by selection of a highest-ranking resource, and/or multiple notifications may be presented to a user in order of ranking.

Figure 7:
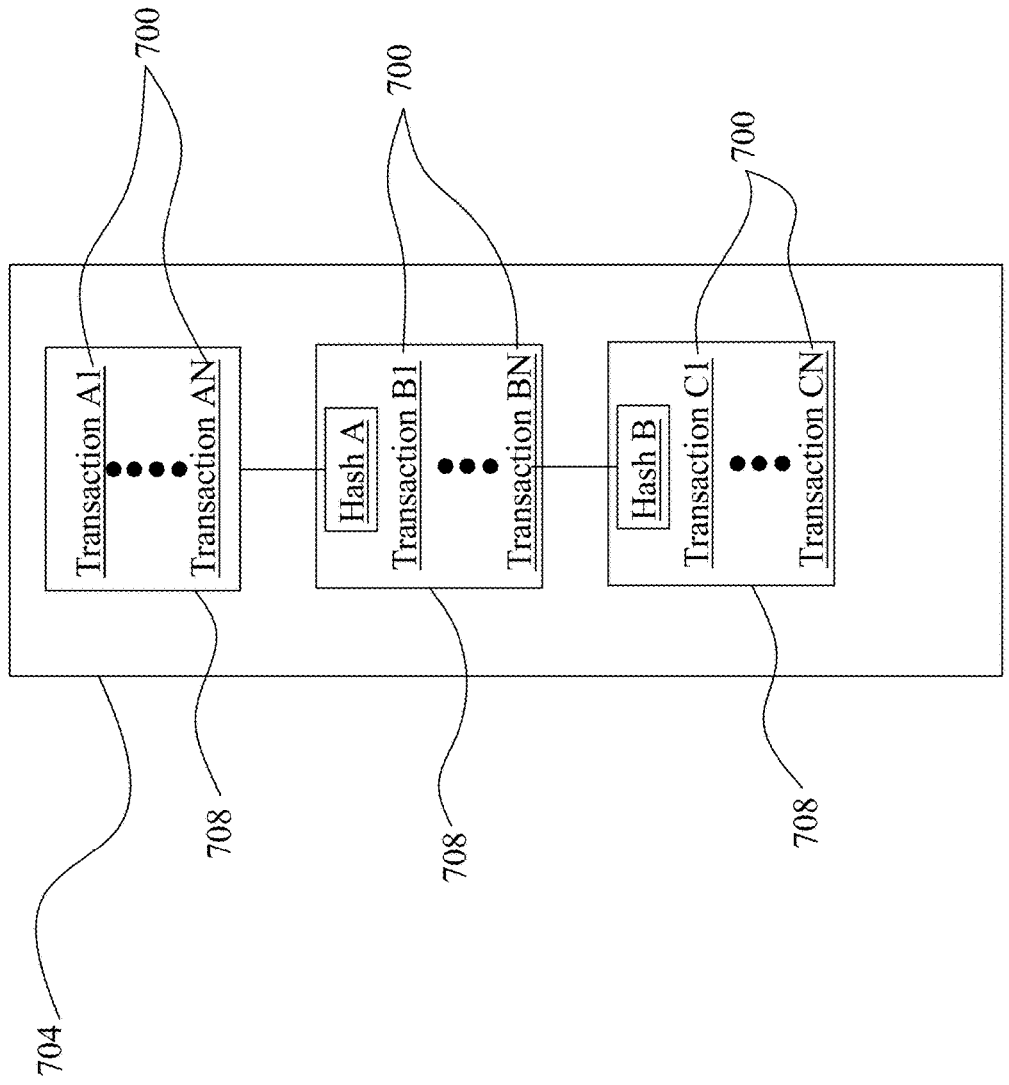
FIG. 7 is a block diagram of exemplary embodiment of an immutable sequential listing.

Referring now to FIG. 7, an exemplary embodiment of an immutable sequential listing is illustrated. An "immutable sequential listing," as used in this disclosure, is a data structure that places data entries in a fixed sequential arrangement, such as a temporal sequence of entries and/or blocks thereof, where the sequential arrangement, once established, cannot be altered, or reordered. An immutable sequential listing may be, include and/or implement an immutable ledger, where data entries that have been posted to the immutable sequential listing cannot be altered. Data elements are listing in immutable sequential listing; data elements may include any form of data, including textual data, image data, encrypted data, cryptographically hashed data, and the like. Data elements may include, without limitation, one or more at least a digitally signed assertions. In one embodiment, a digitally signed assertion 704 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 704. In an embodiment, collection of textual data states that the owner of a certain transferable item represented in a digitally signed assertion 704 register is transferring that item to the owner of an address. A digitally signed assertion 704 may be signed by a digital signature created using the private key associated with the owner's public key, as described above.

Still referring to FIG. 7, a digitally signed assertion 704 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion 704 may describe the transfer of a physical good; for instance, a digitally signed assertion 704 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 704 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 7, in one embodiment, an address is a textual datum identifying the recipient of virtual currency or another item of value in a digitally signed assertion 704. In some embodiments, address is linked to a public key, the corresponding private key of which is owned by the recipient of a digitally signed assertion 704. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 704 may record a subsequent a digitally signed assertion 704 transferring some or all of the value transferred in the first a digitally signed assertion 704 to a new address in the same manner. A digitally signed assertion 704 may contain textual information that is not a transfer of some item of value in addition to, or as an alternative to, such a transfer. For instance, as described in further detail below, a digitally signed assertion 704 may indicate a confidence level associated with a distributed storage node as described in further detail below.

In an embodiment, and still referring to FIG. 7 immutable sequential listing records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 7, immutable sequential listing may preserve the order in which the at least a posted content took place by listing them in chronological order; alternatively or additionally, immutable sequential listing may organize digitally signed assertions 704 into sub-listings 708 such as "blocks" in a blockchain, which may be themselves collected in a temporally sequential order; digitally signed assertions 704 within a sub-listing 708 may or may not be temporally sequential. The ledger may preserve the order in which at least a posted content took place by listing them in sub-listings 708 and placing the sub-listings 708 in chronological order. The immutable sequential listing may be a distributed, consensus-based ledger, such as those operated according to the protocols promulgated by Ripple Labs, Inc., of San Francisco, Calif., or the Stellar Development Foundation, of San Francisco, Calif., or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 7, immutable sequential listing, once formed, may be inalterable by any party, no matter what access rights that party possesses. For instance, immutable sequential listing may include a hash chain, in which data is added during a successive hashing process to ensure non-repudiation. Immutable sequential listing may include a block chain. In one embodiment, a block chain is immutable sequential listing that records one or more new at least a posted content in a data item known as a sub-listing 708 or "block." An example of a block chain is the BITCOIN block chain used to record BITCOIN transactions and values. Sub-listings 708 may be created in a way that places the sub-listings 708 in chronological order and link each sub-listing 708 to a previous sub-listing 708 in the chronological order so that any computing device may traverse the sub-listings 708 in reverse chronological order to verify any at least a posted content listed in the block chain. Each new sub-listing 708 may be required to contain a cryptographic hash describing the previous sub-listing 708. In some embodiments, the block chain contains a single first sub-listing 708 sometimes known as a "genesis block."

Still referring to FIG. 7, the creation of a new sub-listing 708 may be computationally expensive; for instance, the creation of a new sub-listing 708 may be designed by a "proof of work" protocol accepted by all participants in forming the immutable sequential listing to take a powerful set of computing devices a certain period of time to produce. Where one sub-listing 708 takes less time for a given set of computing devices to produce the sub-listing 708 protocol may adjust the algorithm to produce the next sub-listing 708 so that it will require more steps; where one sub-listing 708 takes more time for a given set of computing devices to produce the sub-listing 708 protocol may adjust the algorithm to produce the next sub-listing 708 so that it will require fewer steps. As an example, protocol may require a new sub-listing 708 to contain a cryptographic hash describing its contents; the cryptographic hash may be required to satisfy a mathematical condition, achieved by having the sub-listing 708 contain a number, called a nonce, whose value is determined after the fact by the discovery of the hash that satisfies the mathematical condition. Continuing the example, the protocol may be able to adjust the mathematical condition so that the discovery of the hash describing a sub-listing 708 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 708 according to the protocol is known as "mining." The creation of a new sub-listing 708 may be designed by a "proof of stake" protocol as will be apparent to those skilled in the art upon reviewing the entirety of this disclosure.

Continuing to refer to FIG. 7, in some embodiments, protocol also creates an incentive to mine new sub-listings 708. The incentive may be financial; for instance, successfully mining a new sub-listing 708 may result in the person or entity that mines the sub-listing 708 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 708 Each sub-listing 708 created in immutable sequential listing may contain a record or at least a posted content describing one or more addresses that receive an incentive, such as virtual currency, as the result of successfully mining the sub-listing 708.

With continued reference to FIG. 7, where two entities simultaneously create new sub-listings 708, immutable sequential listing may develop a fork; protocol may determine which of the two alternate branches in the fork is the valid new portion of the immutable sequential listing by evaluating, after a certain amount of time has passed, which branch is longer. "Length" may be measured according to the number of sub-listings 708 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 708 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing.

Still referring to FIG. 7, additional data linked to at least a posted content may be incorporated in sub-listings 708 in the immutable sequential listing; for instance, data may be incorporated in one or more fields recognized by block chain protocols that permit a person or computer forming a at least a posted content to insert additional data in the immutable sequential listing. In some embodiments, additional data is incorporated in an unspendable at least a posted content field. For instance, the data may be incorporated in an OP_RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 7, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 708 in a block chain computationally challenging; the incentive for producing sub-listings 708 may include the grant of new crypto-currency to the miners. Quantities of crypto-currency may be exchanged using at least a posted content as described above.

Figure 8:
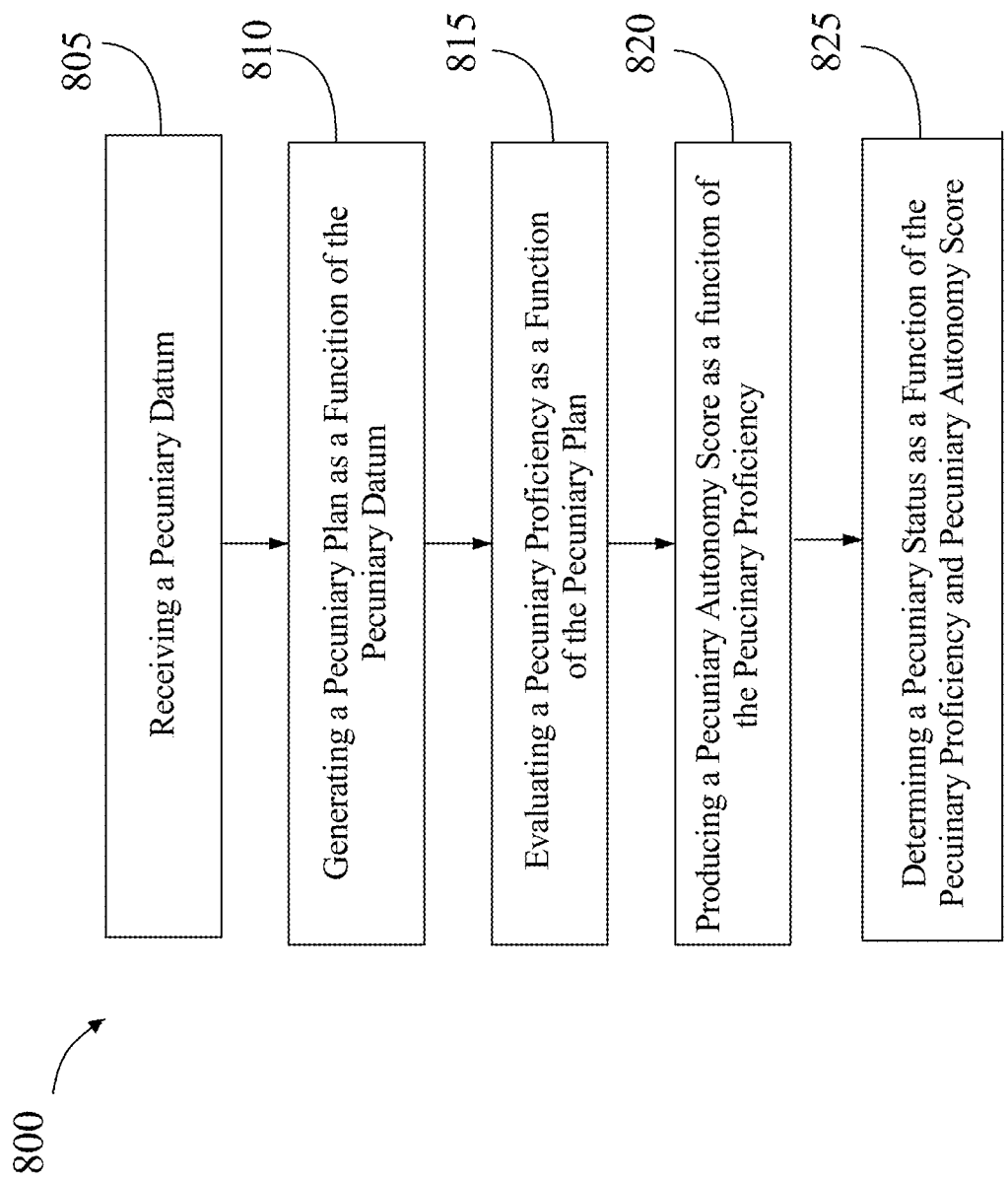
FIG. 8 is a flow diagram of an exemplary method for producing autonomy score.

Referring to FIG. 8, an exemplary method 800 of producing an autonomy score. Method 800 incudes a step 805, receiving, using a processor, a pecuniary datum. This may occur as described above in reference to FIGS. 1-8. In an embodiment, a pecuniary plan may be generated as a function of the pecuniary datum. In another embodiment, a pecuniary target may be generated as a function of the pecuniary datum. A pecuniary datum may be generated as a function on inquiry datum.

With continued reference to FIG. 8, method 800 includes a step 810 of generating, using a processor, a pecuniary plan as a function of the pecuniary datum. This may occur as described above in reference to FIGS. 1-8.

With continued reference to FIG. 8, method 800 includes a step 815 of training, using the processor, a pecuniary machine learning model using a pecuniary training data, wherein the pecuniary training data contains a plurality of data entries containing a plurality of pecuniary plans inputs correlated to a plurality of pecuniary proficiencies as outputs. This may occur as described above in reference to FIGS. 1-8.

With continued reference to FIG. 8, method 800 includes a step 820 of evaluating, using a processor, a pecuniary proficiency of a user as a function of the pecuniary plan, wherein the pecuniary proficiency of the user is evaluated using the pecuniary machine learning model. This may occur as described above in reference to FIGS. 1-8. In an embodiment, a pecuniary improvement datum is generated as a function of the pecuniary proficiency. A pecuniary skill target may be generated as a function of pecuniary proficiency With continued reference to FIG. 8, method 800 includes a step 825 of producing, using a processor, an autonomy score as a function of the pecuniary proficiency. This may occur as described above in reference to FIGS. 1-8. In an embodiment, the autonomy score may be generated as a function of user demographics.

With continued reference to FIG. 8, method 800 includes a step 830 of determining, using a processor, a pecuniary status of a user as a function of the pecuniary proficiency and the autonomy score. This may occur as described above in reference to FIGS. 1-8. In an embodiment, a pecuniary status may be determined as a function of a geographic datum. In another embodiment a pecuniary status may be generated using a status machine learning model. A decentralized fiat may be generated as a function of improving pecuniary status.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
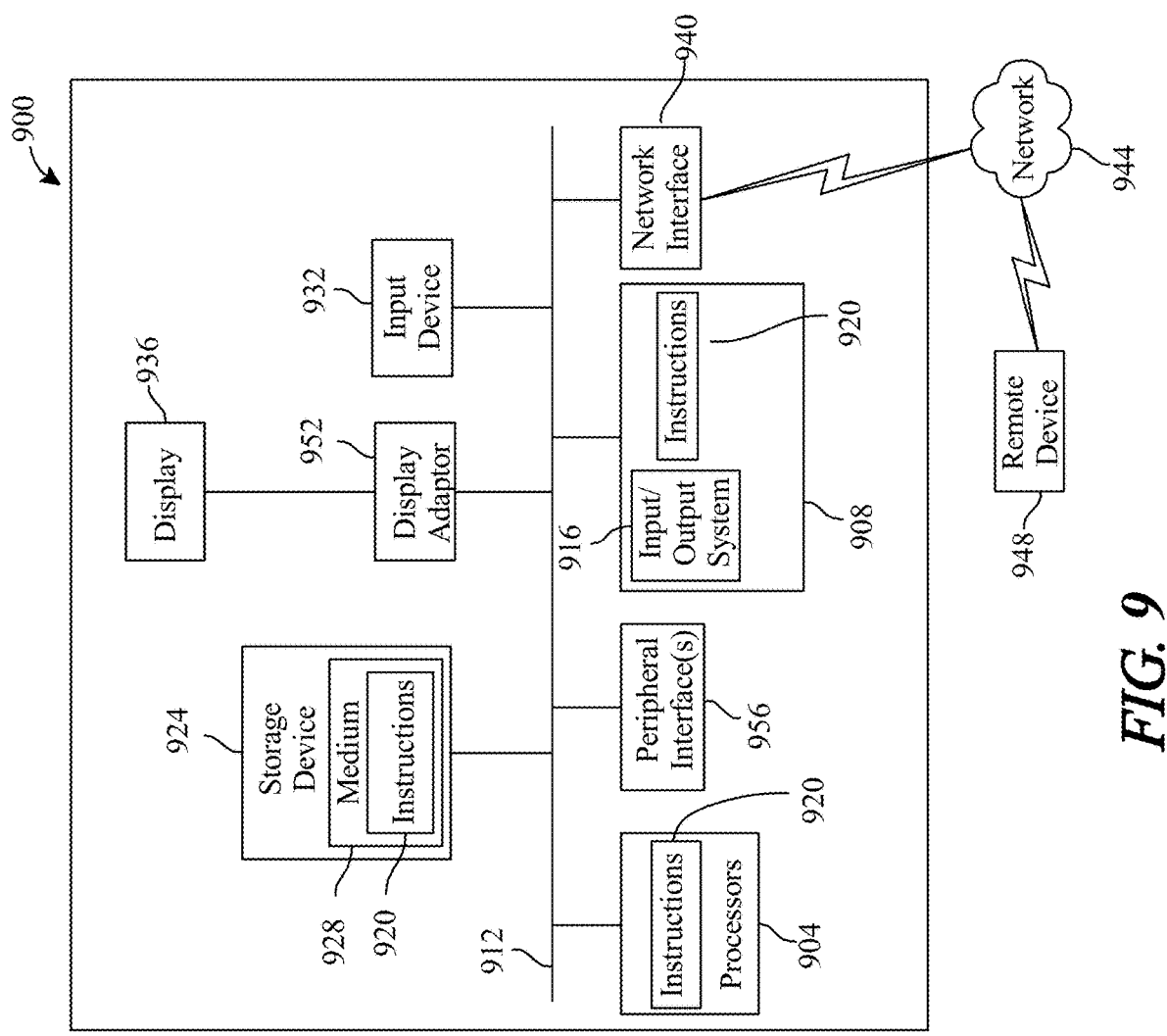
FIG. 9 is a block diagram of a computing system that can be used to implement any one-off the drawings are not necessarily to scale and may be illustrated by phantom lines, diagrammatic representations, and fragmentary views. In certain instances, details that are not necessary for an understanding of the embodiments or that render other details difficult to perceive may have been omitted.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for producing an autonomy score, wherein the apparatus comprises:
   a processor; and
   a memory communicatively connected to the processor containing instructions configuring the processor to:
   receive a pecuniary datum;
   generate a pecuniary plan as a function of the pecuniary datum;
   evaluate a pecuniary proficiency of a user, wherein the pecuniary proficiency of the user is evaluated using a pecuniary machine learning model configured to:
   train a pecuniary machine learning model using a pecuniary training data, wherein the pecuniary training data contains a plurality of data entries containing a plurality of pecuniary plans as inputs correlated to a plurality of pecuniary proficiencies as outputs, wherein the pecuniary training data comprises past pecuniary proficiencies, wherein training the pecuniary machine learning model comprises:
   updating the pecuniary training data with input and output results from the pecuniary machine learning model;
   retraining the pecuniary machine learning model with an updated pecuniary training data; and
   evaluate the pecuniary proficiency of a user as a function of the pecuniary plan using the pecuniary machine learning model; and
   produce an autonomy score as a function of the pecuniary proficiency; and
   determine a pecuniary status of a user, wherein the pecuniary status of the user is determined using a status machine learning model configured to:
   train a status machine learning model using status training data, wherein the status machine learning model contains a plurality of data entries containing a plurality of pecuniary proficiency inputs correlated to an autonomy score, wherein training the status machine learning model comprises:
   updating the status training data with input and output results from the status machine learning model;
   retraining the status machine learning model with an updated status training data; and
   generate a decentralized fiat as a function of the pecuniary status, wherein the decentralized fiat comprises at least a non-fungible token;
   issue a certificate of completion after user has a produced the autonomy score, wherein the decentralized fiat is used to represent the certificate of completion.

2. The apparatus of claim 1, wherein a pecuniary improvement datum is generated as a function of the pecuniary proficiency.

3. The apparatus of claim 1, wherein the pecuniary status is determined as a function of a geographic datum.

4. The apparatus of claim 1, wherein the autonomy score is generated as a function of user demographics.

5. The apparatus of claim 1, wherein a pecuniary plan is generated as a function of the pecuniary datum.

6. The apparatus of claim 1, wherein a pecuniary target is generated as a function of the pecuniary datum.

7. The apparatus of claim 1, wherein pecuniary datum is generated as a function on inquiry datum.

8. The apparatus of claim 1, wherein a pecuniary skill target is generated as a function of pecuniary proficiency.

9. A method of producing an autonomy score, wherein the method comprises:
   receiving, using a processor, a pecuniary datum;
   generating, using the processor, a pecuniary plan as a function of the pecuniary datum;
   training, using the processor, a pecuniary machine learning model using a pecuniary training data, wherein the pecuniary training data contains a plurality of data entries containing a plurality of pecuniary plans inputs correlated to a plurality of pecuniary proficiencies as outputs, wherein the pecuniary training data comprises past pecuniary proficiencies, wherein training the pecuniary machine learning model comprises:
   updating the pecuniary training data with input and output results from the pecuniary machine learning model;
   retraining the pecuniary machine learning model with an updated pecuniary training data; and
   evaluating, using the processor, a pecuniary proficiency of a user as a function of the pecuniary plan, wherein the pecuniary proficiency of the user is evaluated using the pecuniary machine learning model;

producing, using the processor, an autonomy score as a function of the pecuniary proficiency; and determining, using the processor, a pecuniary status of a user utilizing a status machine learning model comprising:

training the status machine learning model using status training data, wherein the status machine learning model contains a plurality of data entries containing a plurality of pecuniary proficiency inputs correlated to an autonomy score, wherein training the status machine learning model comprises:

updating the status training data with input and output results from the status machine learning model;

retraining the status machine learning model with an updated status training data; and generating, using the processor, a decentralized fiat as a function of the pecuniary status, wherein the decentralized fiat comprises a non-fungible token;

issuing a certificate of completion after user has a produced the autonomy score, wherein the decentralized fiat is used to represent the certificate of completion.

10. The method of claim 9, wherein a pecuniary improvement datum is generated as a function of the pecuniary proficiency.

11. The method of claim 9, wherein the pecuniary status is determined as a function of a geographic datum.

12. The method of claim 9, wherein the autonomy score is generated as a function of user demographics.

13. The method of claim 9, wherein a pecuniary plan is generated as a function of the pecuniary datum.

14. The method of claim 9, wherein a pecuniary target is generated as a function of the pecuniary datum.

15. The method of claim 9, wherein pecuniary datum is generated as a function on inquiry datum.

16. The method of claim 9, wherein a pecuniary skill target is generated as a function of pecuniary proficiency.

\* \* \* \* \*